(12) United States Patent
Yoneda et al.

(10) Patent No.: US 12,205,469 B2
(45) Date of Patent: Jan. 21, 2025

(54) INFORMATION PROCESSING METHOD AND INFORMATION PROCESSING SYSTEM

(71) Applicant: Panasonic Intellectual Property Management Co., Ltd., Osaka (JP)

(72) Inventors: Takahiro Yoneda, Osaka (JP); Motoshi Anabuki, Hyogo (JP); Yuki Matsumura, Kyoto (JP); Toshiya Arai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 243 days.

(21) Appl. No.: 17/838,876

(22) Filed: Jun. 13, 2022

(65) Prior Publication Data

US 2022/0309926 A1    Sep. 29, 2022

Related U.S. Application Data

(63) Continuation of application No. PCT/JP2020/044808, filed on Dec. 2, 2020.

(30) Foreign Application Priority Data

Dec. 16, 2019 (JP) ................... 2019-226715

(51) Int. Cl.
   *G08G 1/00* (2006.01)
   *B60W 40/08* (2012.01)
   (Continued)

(52) U.S. Cl.
   CPC ............. *G08G 1/202* (2013.01); *B60W 40/09* (2013.01); *G05D 1/0027* (2013.01);
   (Continued)

(58) Field of Classification Search
   CPC .................. G08G 1/202; B60W 40/09; B60W 2040/0872; B60W 2540/041;
   (Continued)

(56) References Cited

U.S. PATENT DOCUMENTS

| 2013/0311004 | A1  | 11/2013 | Okamura et al. |
| 2014/0207535 | A1* | 7/2014  | Stefan ............... G07C 5/008 701/1 |

(Continued)

FOREIGN PATENT DOCUMENTS

| JP | 5704178    | 4/2015 |
| JP | 2015-92320 | 5/2015 |

(Continued)

OTHER PUBLICATIONS

Extended Search Report issued Jan. 9, 2023 in corresponding European Patent Application No. 20901923.1.

(Continued)

*Primary Examiner* — Jelani A Smith
*Assistant Examiner* — Alyssa Rorie
(74) *Attorney, Agent, or Firm* — Wenderoth, Lind & Ponack, L.L.P.

(57) ABSTRACT

An information processing method to be executed by a computer, the information processing method including: obtaining a self-driving vehicle list and a rider list; obtaining a driving skill of each of a plurality of riders included in the rider list, the driving skill indicating whether the rider is capable of driving; allocating a plurality of self-driving vehicles included in the self-driving vehicle list to the plurality of riders in accordance with the driving skill of each of the plurality of riders to distribute riders capable of driving, among the plurality of riders, across the plurality of self-driving vehicle; and outputting a result of the allocating.

14 Claims, 6 Drawing Sheets

(51) Int. Cl.
  *B60W 40/09*  (2012.01)
  *G05D 1/00*  (2024.01)
  *G06Q 10/02*  (2012.01)
  *G06Q 50/40*  (2024.01)

(52) U.S. Cl.
  CPC .......... *G05D 1/0061* (2013.01); *G06Q 10/02* (2013.01); *G06Q 50/40* (2024.01); *B60W 2040/0872* (2013.01); *B60W 2540/041* (2020.02); *B60W 2540/221* (2020.02); *B60W 2556/10* (2020.02)

(58) Field of Classification Search
  CPC ....... B60W 2540/221; B60W 2556/10; B60W 60/0061; G05D 1/0027; G05D 1/0061; G05D 1/60; G05D 1/69; G05D 1/81; G05D 2105/20; G05D 2105/22; G05D 2109/10; G06Q 10/02; G06Q 10/025; G06Q 10/047; G06Q 10/063; G06Q 10/063112; G06Q 10/063114; G06Q 30/0224; G06Q 50/40
  See application file for complete search history.

(56) References Cited

U.S. PATENT DOCUMENTS

| | | | | |
|---|---|---|---|---|
| 2017/0316696 | A1* | 11/2017 | Bartel | B60K 28/06 |
| 2018/0032928 | A1* | 2/2018 | Li | G06Q 50/40 |
| 2018/0136655 | A1* | 5/2018 | Kim | B60N 2/002 |
| 2018/0240054 | A1* | 8/2018 | Li | G06Q 30/0204 |
| 2018/0356817 | A1* | 12/2018 | Poeppel | G06F 9/542 |
| 2018/0374016 | A1 | 12/2018 | Sano et al. | |
| 2019/0088141 | A1 | 3/2019 | Liu | |
| 2019/0108539 | A1 | 4/2019 | Watanabe et al. | |
| 2019/0204830 | A1 | 7/2019 | Ogura | |
| 2019/0278298 | A1* | 9/2019 | Pedersen | G05D 1/0038 |
| 2020/0101977 | A1 | 4/2020 | Nakai et al. | |
| 2023/0005375 | A1* | 1/2023 | Planson | G08G 1/005 |

FOREIGN PATENT DOCUMENTS

| | | |
|---|---|---|
| JP | 2016-18238 | 2/2016 |
| JP | 2017-174208 | 9/2017 |
| JP | 6201916 | 9/2017 |
| JP | 2018-62223 | 4/2018 |
| JP | 2019-53733 | 4/2019 |
| JP | 2019-70951 | 5/2019 |
| JP | 6589713 | 10/2019 |
| WO | 2012/104964 | 8/2012 |
| WO | 2018/230527 | 12/2018 |

OTHER PUBLICATIONS

International Search Report (ISR) issued on Mar. 9, 2021 in International (PCT) Application No. PCT/JP2020/044808.

* cited by examiner

INFORMATION PROCESSING METHOD AND INFORMATION PROCESSING SYSTEM

CROSS REFERENCE TO RELATED APPLICATIONS

This is a continuation application of PCT International Application No. PCT/JP2020/044808 filed on Dec. 2, 2020, designating the United States of America, which is based on and claims priority of Japanese Patent Application No. 2019-226715 filed on Dec. 16, 2019. The entire disclosures of the above-identified applications, including the specifications, drawings and claims are incorporated herein by reference in their entirety.

FIELD

The present disclosure relates to an information processing method and an information processing system.

BACKGROUND

For example, Patent Literature (PTL) 1 discloses a vehicle system in which automatic operation mode is switched to manual operation mode when an occupant on a vehicle has the aptitude as a driver and to center operation mode when the occupant does not have the aptitude as a driver.

Another example is PTL 2 that discloses a remote operation device including a monitor part that obtains, via a communications network, vehicle information on a self-driving vehicle selected from at least one of a generated vehicle distribution plan and a managed schedule and displays the information.

CITATION LIST

Patent Literature

PTL 1: Japanese Unexamined Patent Application Publication No. 2018-62223
PTL 2: Japanese Patent No. 6589713

SUMMARY

Technical Problem

However, it is sometimes difficult for the conventional technologies to enable a self-driving vehicle to continue to operate when such self-driving vehicle becomes unable to run autonomously. For example, when the number of self-driving vehicles that have become unable to run autonomously exceeds the number of operators who remotely control self-driving vehicles instead of the vehicles, the operations of self-driving vehicles that cannot be controlled by the operators will stop. Also, when a rider needs to manually operate a self-driving vehicle that becomes unable to run autonomously but no rider on the self-driving vehicle is capable of performing manual operation, the operation of such self-driving vehicle will stop.

In view of the above, the present disclosure aims to provide an information processing method and an information processing system capable of reducing the intervention of an operator in a self-driving vehicle, while preventing the operation of the self-driving vehicle from stopping.

Solution to Problem

The information processing method according to an aspect of the present disclosure is an information processing method to be executed by a computer. The information processing method includes: obtaining a self-driving vehicle list and a rider list; obtaining a driving skill of each of a plurality of riders included in the rider list, the driving skill indicating whether the rider is capable of driving; allocating a plurality of self-driving vehicles included in the self-driving vehicle list to the plurality of riders in accordance with the driving skill of each of the plurality of riders to distribute riders capable of driving, among the plurality of riders, across the plurality of self-driving vehicles; and outputting a result of the allocating.

Note that some of the specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects

According to the information processing method and so forth according to the present disclosure, it is possible to reduce the intervention of an operator in a self-driving vehicle, while preventing the operation of the self-driving vehicle from stopping.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
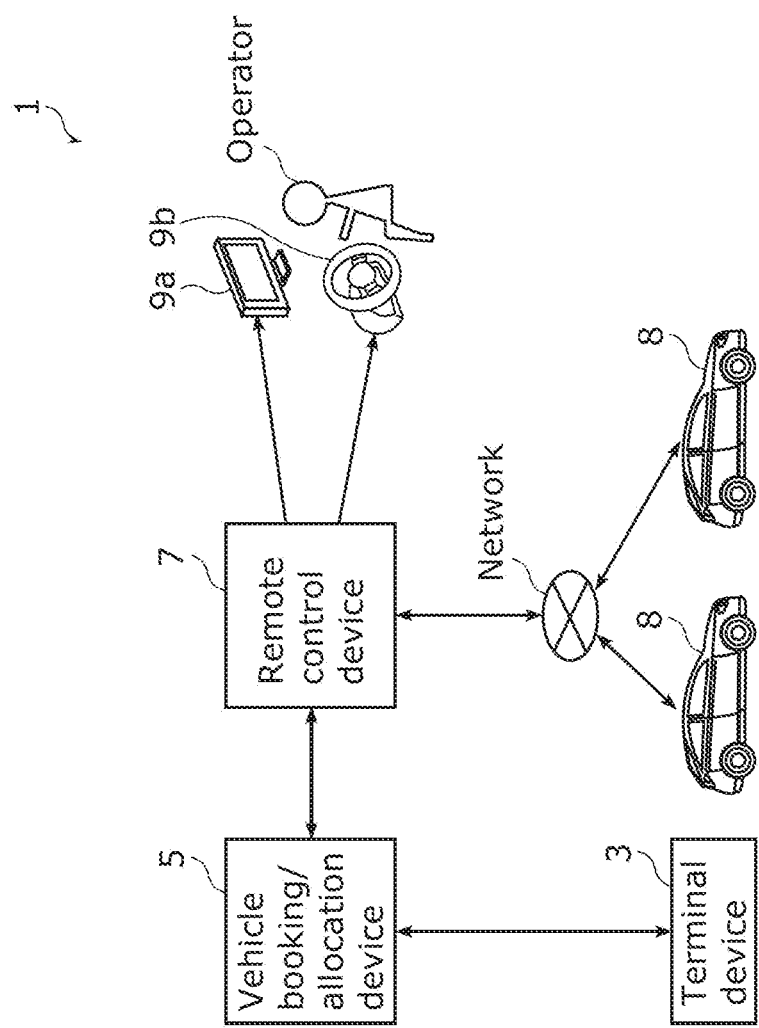
FIG. 1 is a schematic diagram showing an information processing system according to an embodiment.

The information processing method according to an aspect of the present disclosure is an information processing method to be executed by a computer. The information processing method includes: obtaining a self-driving vehicle list and a rider list; obtaining a driving skill of each of a plurality of riders included in the rider list, the driving skill indicating whether the rider is capable of driving; allocating a plurality of self-driving vehicles included in the self-driving vehicle list to the plurality of riders in accordance with the driving skill of each of the plurality of riders to distribute riders capable of driving, among the plurality of riders, across the plurality of self-driving vehicles; and outputting a result of the allocating.

With this, a plurality of riders capable of driving are allocated to be distributed across a plurality of self-driving vehicles as much as possible. This reduces the possibility that no rider capable of driving is riding on a self-driving vehicle. Stated differently, this facilitates the allocation of at least one rider capable of driving to one self-driving vehicle. As such, even when a self-driving vehicle switches from self-driving mode to manual driving mode, for example, a rider capable of driving can drive the self-driving vehicle that is in manual driving mode. This prevents the operation of the self-driving vehicle from stopping. This also reduces the number of self-driving vehicles on which no rider capable of driving is riding, i.e., the number of self-driving vehicles that need to be remotely controlled by operators. Consequently, it is possible to prevent the operations of self-driving vehicles from stopping due to the shortage of operators. Stated differently, it is possible to increase the number of self-driving vehicles with reduced operator intervention. As described above, the present disclosure is capable of reducing operator intervention in self-driving vehicles, while preventing the operations of self-driving vehicles from stopping.

The information processing system according to another aspect of the present disclosure is an information processing system to be executed by a computer. The information processing system includes: an obtainer that obtains a self-driving vehicle list, a rider list, and a driving skill of each of a plurality of riders included in the rider list, the driving skill indicating whether the rider is capable of driving; an allocator that allocates a plurality of self-driving vehicles included in the self-driving vehicle list to the plurality of riders in accordance with the driving skill of each of the plurality of riders to distribute the plurality of self-driving vehicles to riders capable of driving, among the plurality of riders, across the plurality of self-driving vehicles; and an outputter that outputs a result of the allocating of the plurality of self-driving vehicles.

Such information processing system also achieves the same operational advantages as those described above.

The information processing method according to another aspect of the present disclosure further includes: obtaining a driving acceptability of each of the riders capable of driving, the driving acceptability indicating whether the rider capable of driving is to accept a driving request, wherein the allocating includes allocating the plurality of self-driving vehicles to the riders capable of driving, also in accordance with the driving acceptability of each of the riders capable of driving.

With this, it is possible to perform the foregoing allocating in a manner that the riders who can drive and respond to a driving request are distributed across a plurality of self-driving vehicles. Thus, by allocating the riders who are practically able to drive in a distributed manner, it is possible to more reliably prevent the operations of self-driving vehicles from stopping.

The information processing method according to another aspect of the present disclosure further includes: obtaining a physical condition of each of the riders capable of driving. Here, the allocating includes allocating the plurality of self-driving vehicles to the riders capable of driving, also in accordance with the physical condition of each of the riders capable of driving.

With this, it is possible to allocate the riders capable of driving also in consideration of the physical conditions of such riders. It can be practically difficult for a rider to drive, depending on his/her physical condition, even if such rider has a driving skill. Thus, by allocating riders who are practically able to drive in a distributed manner, it is possible to more reliably prevent the operations of self-driving vehicles from stopping.

The information processing method according to another aspect of the present disclosure further includes: in a self-driving vehicle among the plurality of self-driving vehicles allocated, guiding a rider toward a driver's seat via a presentation device, when it is detected that the rider is one of the riders capable of driving.

With this, it is possible to cause a rider capable of driving to be seated in the driver's seat as much as possible when such rider is getting on a self-driving vehicle. This makes it easier to cause such rider capable of driving to drive when the mode switches to manual driving mode. Also, this configuration requires no system for, for example, causing a rider to move to the driver's seat.

The information processing method according to another aspect of the present disclosure further includes: guiding a rider toward a seat other than a driver's seat via a presentation device, when it is detected that the rider is none of the riders capable of driving.

With this, it is possible to cause a rider incapable of driving not to be seated in the driver's seat when such rider is getting on a self-driving vehicle. It is thus possible to leave the driver's seat empty as much as possible for a rider capable of driving. This makes it easier to cause the rider capable of driving to be seated in the driver's seat. This consequently makes it easier to cause such rider capable of driving to drive when the mode switches to manual driving mode. Also, this configuration requires no system for, for example, causing a rider to move to the driver's seat.

The information processing method according to another aspect of the present disclosure further includes: when a rider capable of driving among the riders capable of driving is booking a self-driving vehicle, guiding, via a presentation device, the rider to book a self-driving vehicle that is allocated to no other rider among the riders capable of driving.

With this, it is possible to cause a rider capable of driving to book the driver's seat as much as possible. This makes it easier to cause such rider capable of driving to drive when the mode switches to manual driving mode. Also, this configuration requires no system for, for example, causing a rider to move to the driver's seat.

The information processing method according to another aspect of the present disclosure further includes: when a self-driving vehicle on which a rider capable of driving among the riders capable of driving is riding becomes unable to run autonomously, notifying the rider of a driving request via a presentation device.

With this, it is possible to prompt a rider capable of driving to perform manual driving. This thus more reliably prevents the operation of the self-driving vehicle from stopping.

The information processing method according to another aspect of the present disclosure further includes: when the self-driving vehicle on which the rider capable of driving is riding becomes unable to run autonomously, providing the rider with driver assist information appropriate to the rider via the presentation device.

With this, it is possible to enhance the safety of a rider's driving of a self-driving vehicle. It is assumed that riders will become less accustomed to driving with the widespread use of self-driving vehicles because of reduced opportunities to perform driving. The foregoing configuration enables the rider to drive with peace of mind.

The information processing method according to another aspect of the present disclosure further includes: obtaining a driving history of each of the riders capable of driving. Here, the allocating includes allocating the plurality of self-driving vehicles to the plurality of riders, also in accordance with the driving history of each of the riders capable of driving.

With this, it is possible to allocate riders who are accustomed to driving or good at driving in a distributed manner, among the riders capable of driving. This thus increases the quality and safety of self-driving vehicles when they are manually operated.

The information processing method according to another aspect of the present disclosure further includes: providing a benefit to each of the riders capable of driving, based on a result of manual driving performed by the rider capable of driving.

With this, it is possible, for example, to provide benefits such as reducing the cost of a self-driving vehicle, etc., to a rider with experience of driving a self-driving vehicle. This increases the motivation of the rider toward driving, thus enabling the rider to positively accept manual driving. This thus more reliably prevents the operation of the self-driving vehicle from stopping.

The information processing method according to another aspect of the present disclosure further includes: when a rider capable of driving among the riders capable of driving is booking a self-driving vehicle, presenting a benefit to the rider via a presentation device, based on whether another rider to whom the self-driving vehicle is allocated has the driving skill, the benefit being presented on a self-driving vehicle basis.

With this, it is possible to control the selection of a self-driving vehicle made by the rider capable of driving. This enables the allocation of riders capable of driving in a distributed manner, while leaving freedom of selection to the rider capable of driving. For example, at the time of booking, it is possible to present, to a rider capable of driving, that benefits are available from self-driving vehicles booked by no rider capable of driving and having empty seat(s). The presentation of the benefits facilitates the booking of a self-driving vehicle booked by no rider capable of driving and having empty seat(s).

The information processing method according to another aspect of the present disclosure further includes: when a rider incapable of driving among the plurality of riders is booking a self-driving vehicle, presenting a benefit to the rider incapable of driving via a presentation device, based on whether another rider to whom the self-driving vehicle is allocated has the driving skill, the benefit being presented on a self-driving vehicle basis.

With this, it is possible to control the selection of a self-driving vehicle made by the rider incapable of driving. This enables the allocation of riders capable of driving in a distributed manner, while leaving freedom of selection to the rider incapable of driving. For example, at the time of booking, it is possible to allocate, to a rider incapable of driving, a self-driving vehicle booked by a rider capable of driving and having empty seat(s). In this case, the empty seat(s) can be occupied by rider(s) incapable of driving, thus preventing a rider capable of driving from booking such self-driving vehicle. At the time of booking, it is also possible to allocate, to a rider incapable of driving, a self-driving vehicle that is booked by no rider capable of driving and still has empty seat(s) after such rider makes a booking. In this case, it is possible to leave an empty seat for a rider capable of driving so that such rider can book the vehicle.

The information processing method according to another aspect of the present disclosure further includes: determining a monitoring priority of each of the plurality of self-driving vehicles in accordance with the result of the allocating of the plurality of self-driving vehicles to the riders capable of driving; and notifying an operator of information on the self-driving vehicle in accordance with the monitoring priority.

With this, it is possible to change the priority of monitoring performed by the operator, depending on whether a rider capable of driving is riding on a self-driving vehicle. This is because the operation of a self-driving vehicle on which a rider capable of driving is riding can be started again by performing manual driving. This thus promotes the efficiency of monitoring self-driving vehicles, while preventing the operation of the self-driving vehicles from stopping. Consequently, the operator is only required to preferentially monitor a self-driving vehicle with a high monitoring priority, which can reduce the burden on the operator of having to monitor self-driving vehicles.

In the information processing method according to another aspect of the present disclosure, in the determining, a lower monitoring priority is given to each of the plurality of self-driving vehicles to which the riders capable of driving are allocated than the monitoring priority of another one of the plurality of self-driving vehicles to which none of the riders capable of driving is allocated.

With this, it is possible for the operator to preferentially monitor a self-driving vehicle with a high monitoring priority, i.e., a self-driving vehicle on which a rider incapable of driving is riding. This enables the operator to promptly take a remote control of the self-driving vehicle that becomes unable to run autonomously. This thus more reliably prevents the operation of the self-driving vehicle from stopping.

An exemplary embodiment described below shows a specific example of the present disclosure. The numerical values, shapes, materials, elements, the dispositions and positions of the elements, etc. shown in the following exemplary embodiment are mere examples, and therefore not intended to limit the scope of the present disclosure. Therefore, among the elements in the following exemplary embodiment, those not recited in any one of the independent claims are described as optional elements. Also, the details of each embodiment can be combined.

Hereinafter, the information processing method and the information processing system according to an aspect of the present disclosure is described with reference to the accompanying Drawings.

Embodiment

<Configuration: Information Processing System 1>

FIG. 1 is a schematic diagram showing information processing system 1 according to the embodiment.

As shown in FIG. 1, information processing system 1 is a system capable of allocating/dispatching self-driving vehicle 8 that is a vehicle having the self-driving function and the manual driving function to a rider upon request of such rider. Information processing system 1 is capable of allocating/dispatching self-driving vehicle 8 suitable for the rider, on the basis of information obtained from the rider who uses terminal device 3, etc. Self-driving vehicle 8 according to the present embodiment switches from self-driving mode to manual driving mode and from manual driving mode to self-driving mode, in accordance with an external environment around the vehicle. Note that self-driving vehicle 8 may also be an autonomous mobile object of another type that is capable of carrying a rider. Exemplary autonomous mobile objects include a mobile robot, a ship, and an air vehicle such as a drone.

Information processing system 1 is applied to a sharing utilization platform that provide self-driving vehicles 8 to, for example, ride-sharing services and ride hailing services.

The following more specifically describes the configuration of information processing system 1.

Information processing system 1 includes terminal device 3, vehicle booking/allocation device 5, remote control device 7, video display device 9a, operation input device 9b, and self-driving vehicles 8.

[Terminal Device 3]

Terminal device 3 is a rider's terminal, such as a personal computer, a smartphone, and a tablet terminal, that is connected to vehicle booking/allocation device 5 via a network, etc. to be able to perform wireless or wired communications with vehicle booking/allocation device 5.

Terminal device 3 receives a rider's input of rider information in information processing system 1, thereby causing vehicle booking/allocation device 5 to make a rider registration of the rider. At the time of the rider registration, terminal device 3 also causes the rider to input driving qualification information (also referred to as "driving skills") indicating whether the rider is capable of driving. The driving qualification information is information indicating, for example, whether the rider has a driver's license, whether the rider has taken driving lessons, etc. Terminal device 3 sends the rider information to vehicle booking/allocation device 5. The rider information includes information for identifying the rider (i.e., rider ID), the rider's name, contact number, driving qualification information, etc.

Terminal device 3 also accepts, from the rider (hereinafter also referred to as "booking person"), an input of a ride booking for allocation/dispatch of self-driving vehicle 8, thereby sending the ride booking to vehicle booking/allocation device 5. In response to the booking person inputting the acceptability of driving self-driving vehicle 8, terminal device 3 sends the driving acceptability information to vehicle booking/allocation device 5. The driving acceptability indicates whether the rider capable of driving is willing to accept driving at a point in time when the rider is performing an input of the ride booking. The ride booking includes desired conditions (place of departure, destination, time of departure, and time of arrival), the rider ID, and driving acceptability information.

Terminal device 3 also receives bookable vehicle information generated by vehicle allocation controller 54 (refer to FIG. 2 to be described later) of vehicle booking/allocation device 5. Terminal device 3 presents the received bookable vehicle information to the booking person who has performed the input of the ride booking. The booking person checks the bookable vehicle information to determine self-driving vehicle 8 such person wishes to ride. Terminal device 3 generates determination information on the basis of a determination operation performed by the booking person. The determination information includes the rider ID, information for identifying self-driving vehicle 8 the booking person wishes to ride (i.e., vehicle ID), departure place information, destination information, departure time information indicating the time of departing the place of departure, arrival time information indicating the time of arriving at the destination, etc.

Terminal device 3 also sends the determination information generated by the booking person to vehicle booking/allocation device 5.

[Vehicle Booking/Allocation Device 5]

Figure 2:
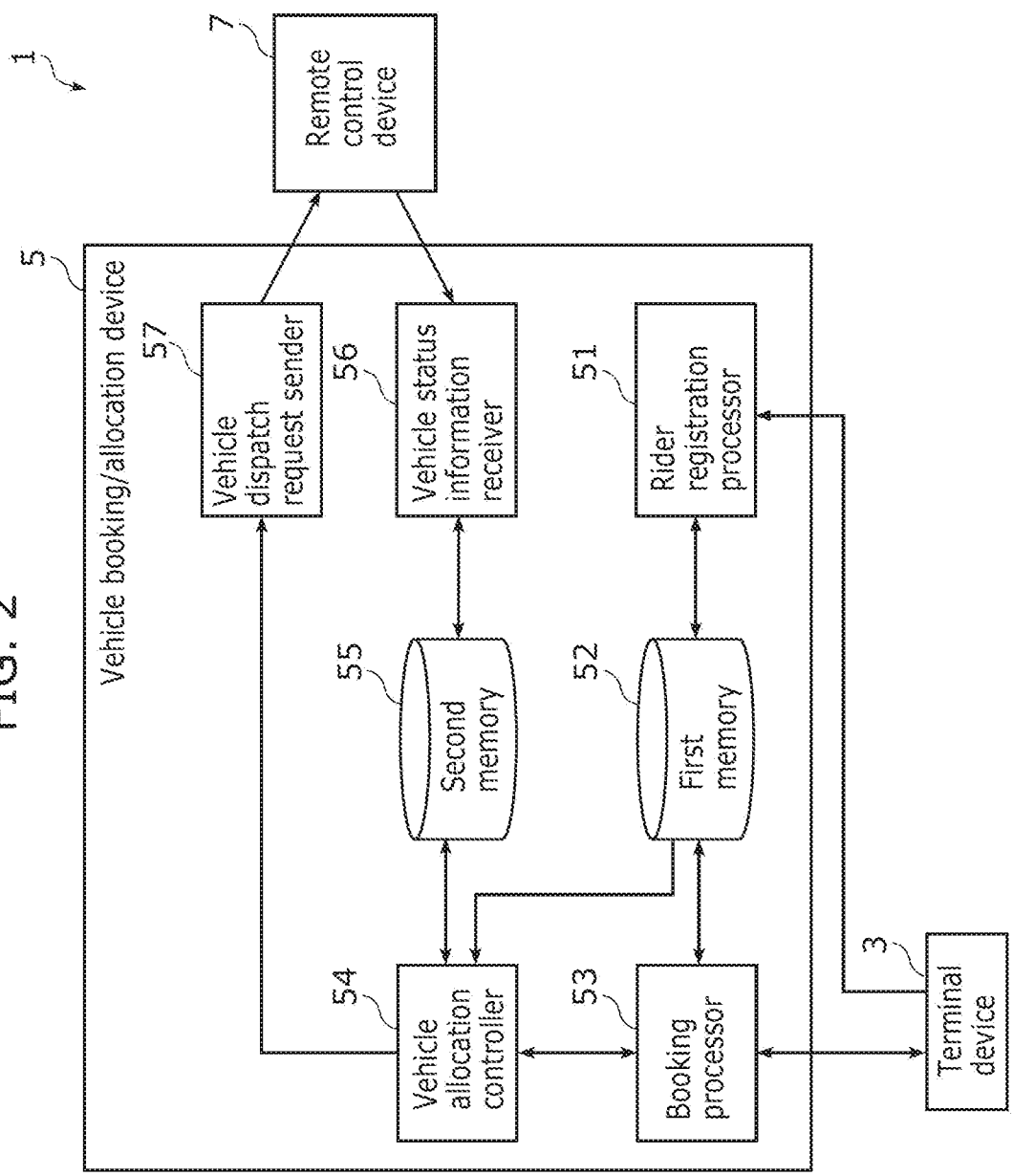
FIG. 2 is a block diagram showing a vehicle booking/allocation device, a terminal device, and a remote control device in the information processing system according to the embodiment.

FIG. 2 is a block diagram showing vehicle booking/allocation device 5, terminal device 3, and remote control device 7 in information processing system 1 according to the embodiment.

As shown in FIG. 2, vehicle booking/allocation device 5 is connected to terminal device 3 and remote control device 7 to be able to perform wireless or wired communications. Vehicle booking/allocation device 5 obtains the ride booking inputted by the booking person, thereby booking and allocating/dispatching self-driving vehicle 8 desired by the booking person.

Vehicle booking/allocation device 5 includes rider registration processor 51, first memory 52, booking processor 53, vehicle allocation controller 54, second memory 55, vehicle status information receiver 56, and vehicle dispatch request sender 57.

Upon receiving the rider information from terminal device 3, rider registration processor 51 causes first memory 52 to record the rider information. More specifically, rider registration processor 51 registers the rider information received from terminal device 3 in rider database in first memory 52.

First memory 52 records the rider database that includes the rider information. First memory 52 also outputs the rider information stored in the rider database upon request of booking processor 53 and vehicle allocation controller 54.

Booking processor 53 processes the booking of self-driving vehicle 8 made by the rider. More specifically, booking processor 53 performs processing such as accepting a ride booking, giving a notification about bookable vehicles, confirming the ride booking, etc.

Upon receiving the ride booking from terminal device 3, booking processor 53 checks whether the rider information of the booking person who has inputted the ride booking is registered in the rider database in first memory 52. When such rider information is registered in the rider database, booking processor 53 sends, to vehicle allocation controller 54, a request for bookable vehicle information together with the ride booking. In response to the request, booking processor 53 obtains bookable vehicle information that satisfies the requirements of the ride booking. Booking processor 53 sends the obtained bookable vehicle information to terminal device 3. Note that when the foregoing rider information is not registered in the rider database, booking processor 53 may reject the ride booking, and prompt, via terminal device 3, the user to make a rider registration.

Upon receiving the determination information from terminal device 3 as a response to the bookable vehicle information, booking processor 53 determines that the determination information is booking confirmation information. More specifically, booking processor 53 stores, in the rider database, the determination information in association with the rider information. Booking processor 53 also outputs the received determination information to vehicle allocation controller 54.

Vehicle allocation controller 54, which is an exemplary allocator, generates bookable vehicle information on the basis of the ride booking and the rider information. More specifically, vehicle allocation controller 54 obtains, from operating vehicle database in second memory 55, a list of self-driving vehicles 8 having operation schedules that satisfy the desired conditions of the ride booking, among self-driving vehicles 8 already having operation schedules.

Vehicle allocation controller 54 also obtains, from the operating vehicle database, a list of self-driving vehicles 8 having no operation schedule. Vehicle allocation controller 54 generates a list of allocatable self-driving vehicles 8 (such list is hereinafter also referred to as "allocatable vehicle list") from these two obtained lists of self-driving vehicles 8.

The operating vehicle database includes vehicle operation information indicating the operating status of each self-driving vehicle 8. The vehicle operation information includes the vehicle ID, the number of empty seats, the rider ID of each rider being booked, whether such rider is able to drive, the operation schedule (place of departure, destination, time of departure, time of arrival, and scheduled route), the operating status (whether the vehicle is in operation, the current position, travelled route, and the presence or absence of anomaly), etc.

Vehicle allocation controller 54 refers to the rider database to identify the rider information from the rider ID that is included in the ride booking received from booking processor 53, and obtains the driving skills included in the identified rider information (such driving skills are hereinafter also referred to as "driving skills of the booking person"). Vehicle allocation controller 54 also obtains, from the rider database in first memory 52, the driving skills of the riders who have booked self-driving vehicles 8 included in the allocatable vehicle list.

Vehicle allocation controller 54 allocates a self-driving vehicle 8 to each of a plurality of riders in accordance with the obtained driving skills of the respective riders to distribute riders who are capable of driving, among the plurality of riders, across a plurality of self-driving vehicles 8 included in the operating vehicle database (self-driving vehicle list). More specifically, vehicle allocation controller 54 refers to the allocatable vehicle list obtained from the operating vehicle database in second memory 55 to allocate self-driving vehicle 8 to the booking person, on the basis of the driving skills included in the obtained rider information. The result of such allocation is generated as bookable vehicle information. Stated differently, vehicle allocation controller 54 refers to the operating vehicle database to extract a list of allocatable vehicles, and refers to the rider database to extract a list of booked riders for each self-driving vehicle 8 included in the allocatable vehicle list. When the driving skills of the booking person indicates that such person is capable of driving, vehicle allocation controller 54 allocates, to such booking person, self-driving vehicle 8 that is booked by no rider capable of driving. When the driving skills of the booking person indicates that such person is incapable of driving, vehicle allocation controller 54 allocates, to such booking person, self-driving vehicle 8 that is booked by a rider capable of driving. Vehicle allocation controller 54 generates bookable vehicle information indicating self-driving vehicle 8 allocated. Vehicle allocation controller 54 outputs the bookable vehicle information to booking processor 53.

Upon obtaining the determination information from booking processor 53, vehicle allocation controller 54 updates, with the information included in the determination information, the vehicle operation information of self-driving vehicle 8 that is identified by the vehicle ID included in the determination information, among items of vehicle operation information included in the operating vehicle database. At least the rider ID included in the determination information is added to the vehicle operation information. Also, whether the rider is capable of driving is added in accordance with whether the rider has the driving skills. Other information is added when such information is not registered yet, and used for update when such information is already registered and a difference is present. Note that whether the rider is able to drive may be added in accordance with the driving acceptability to be described later and the physical condition.

Upon obtaining the determination information from booking processor 53, vehicle allocation controller 54 also sends a vehicle dispatch request of self-driving vehicle 8 indicated in the obtained determination information, and user information to remote control device 7 via vehicle dispatch request sender 57. The vehicle dispatch request includes the vehicle ID and desired conditions (place of departure, destination, time of departure, and time of arrival), etc. The user information includes the rider ID of the rider who has booked such self-driving vehicle 8, whether such rider is able to drive, etc. Vehicle allocation controller 54 may send booking result information corresponding to the determination information to terminal device 3 via booking processor 53, when sending the vehicle dispatch request of self-driving vehicle 8. The booking result information is information indicating that the booking has been confirmed according to the determination information.

Note that vehicle allocation controller 54 may allocate self-driving vehicle 8 also in accordance with the driving acceptability of the riders. More specifically, vehicle allocation controller 54 receives the ride booking from booking processor 53, thereby obtaining the driving acceptability of the booking person. The driving acceptability indicates whether the rider is willing to accept a request for driving. Here, the driving acceptability indicates whether the rider capable of driving is willing to drive self-driving vehicle 8 when the vehicle is in manual driving mode, or a level of manual driving the rider is going to accept. The driving acceptability is stored in association with the rider ID as part of the vehicle operation information of the operating vehicle database, when the determination information is registered. When the booking person has the driving skills and will accept driving, vehicle allocation controller 54 allocates, to such booking person, self-driving vehicle 8 that is booked by no rider capable of driving and accepting driving. When the booking person has the driving skills but such person will not accept driving, vehicle allocation controller 54 allocates, to such booking person, self-driving vehicle 8 that is booked by a rider capable of driving. Note that the driving acceptability may be updated after the booking is completed.

Also, when a rider capable of driving books self-driving vehicle 8, vehicle allocation controller 54 guides, via terminal device 3, such rider to book self-driving vehicle 8 that is allocated to no other rider capable of driving. For example, vehicle allocation controller 54 generates bookable vehicle information that includes presentation control information in which self-driving vehicles 8 allocated to no other rider capable of driving and having empty seat(s) are shown, for example, in an emphasized manner and high on the list, compared to other self-driving vehicles 8. Terminal device 3 presents, to the booking person, bookable vehicles on the basis of the presentation control information included in the bookable vehicle information. Note that when a seat booking is also allowed, presentation control information may be generated for self-driving vehicles 8 having an empty driver's seat.

When self-driving vehicle 8 available for booking is booked, vehicle allocation controller 54 may also present, via terminal device 3, benefits on a basis of self-driving vehicle 8 to a booking person who is capable of driving, in accordance with whether other riders who have booked self-driving vehicle 8 have the driving skills. More specifically, vehicle allocation controller 54 generates presentation control information indicating that greater benefits are available from self-driving vehicle 8 allocated to no other rider capable of driving and having empty seat(s) than from other self-driving vehicles 8. The benefits are, for example, merits from the viewpoint of money or service quality. Examples of the benefits include: discounting the usage fee of self-driving vehicle 8; providing points equivalent to money; providing a coupon, drink, etc.; high-quality transportation services such as silentness, spaciousness of the pace inside of a vehicle.

Also, when self-driving vehicle 8 available for booking is booked, vehicle allocation controller 54 may also present, via terminal device 3, benefits on a basis of self-driving vehicle 8 to a booking person who is incapable of driving, in accordance with whether other riders who have booked the self-driving vehicle 8 have the driving skills. More specifically, vehicle allocation controller 54 generates presentation control information, for a booking person incapable of driving, indicating that benefits are available from self-driving vehicle 8 booked by another rider capable of driving and having empty seat(s). Vehicle allocation controller 54 also generates presentation control information, for a booking person incapable of driving, indicating that benefits are available from self-driving vehicle 8 that is booked by no other rider capable of driving and still has empty seat(s) after such booking person books such vehicle.

Vehicle allocation controller 54 may also provide benefits to a rider capable of driving on the basis of the result of manual driving performed by such rider capable of driving. More specifically, vehicle allocation controller 54 provides benefits to a rider having experience with manually driving self-driving vehicle 8 in manual driving mode, in accordance with a track record of manual driving. Benefits may vary depending on, for example, the details of manual driving or the number of times manual driving has been performed that are shown in the driving history. For example, the grade may be determined in accordance with the details or the number of times of manual driving so that the discount rate of usage fee is differently applied depending on the grade.

Second memory 55 updates the vehicle operation information stored in the operating vehicle database recorded, on the basis of the vehicle status information obtained from remote control device 7 via vehicle status information receiver 56. Second memory 55 also outputs the vehicle operation information stored in the operating vehicle database, upon request of vehicle allocation controller 54.

Vehicle status information receiver 56 receives the vehicle status information of self-driving vehicle 8 from remote control device 7. Vehicle status information receiver 56 receives, from remote control device 7, the vehicle status information at specified time intervals, and outputs the received vehicle status information to second memory 55.

Vehicle dispatch request sender 57 sends a vehicle dispatch request to remote control device 7. Vehicle dispatch request sender 57 sends, to remote control device 7, the vehicle dispatch request and the user information outputted from vehicle allocation controller 54.

[Remote Control Device 7]

Figure 3:
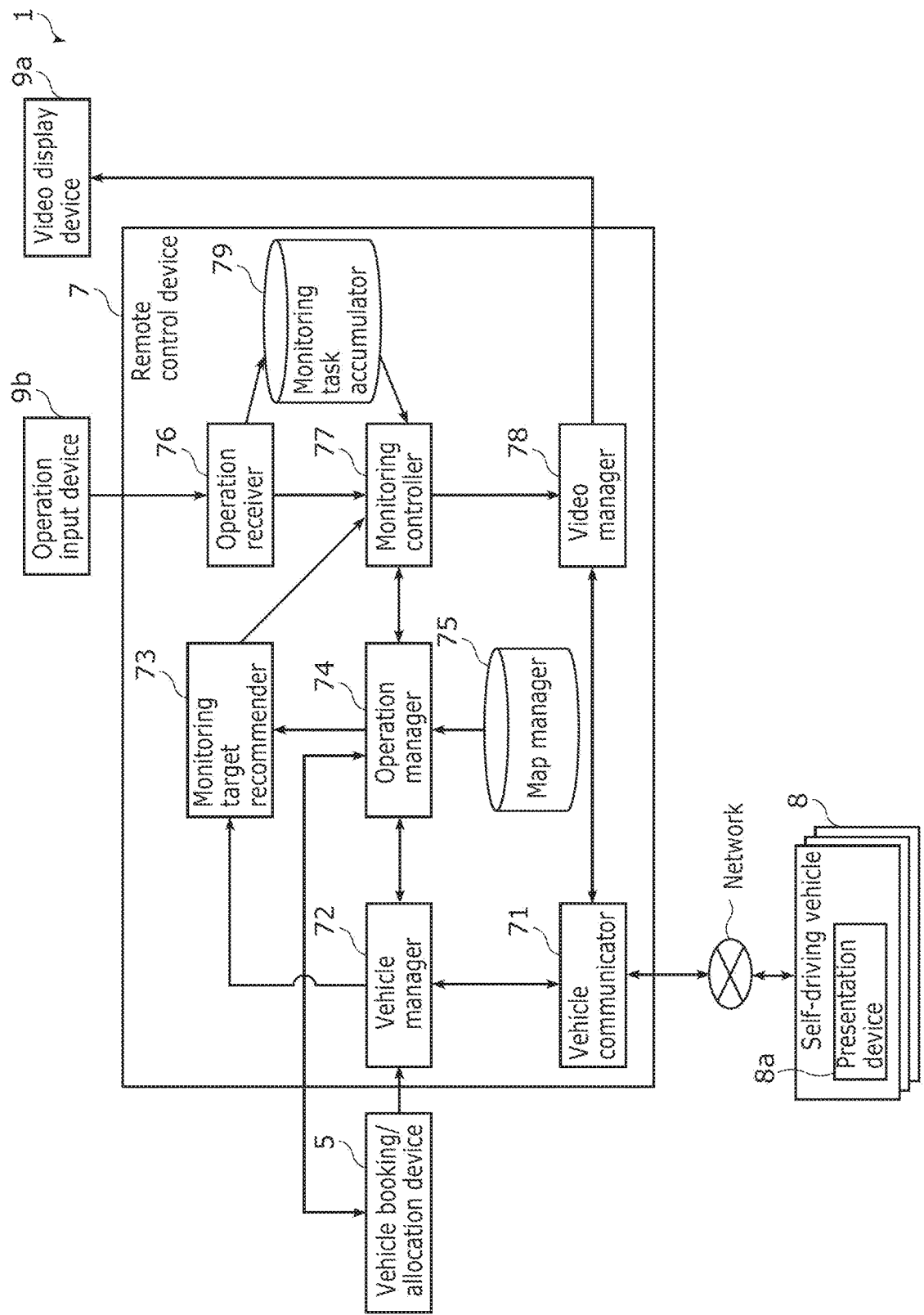
FIG. 3 is a block diagram showing the remote control device, the vehicle booking/allocation device, self-driving vehicles, an operation input device, and a video display device in the information processing system according to the embodiment.

FIG. 3 is a block diagram showing remote control device 7, vehicle booking/allocation device 5, self-driving vehicles 8, operation input device 9b, and video display device 9a in information processing system 1 according to the embodiment.

As shown in FIG. 3, remote control device 7 provides a vehicle dispatch instruction that is based on the vehicle dispatch request for dispatching self-driving vehicle 8 received from vehicle booking/allocation device 5. Remote control device 7 also provides the means for remotely monitoring or remotely controlling self-driving vehicle 8 to an operator who remotely monitors or remotely controls self-driving vehicle 8. The operator is an exemplary monitoring person.

Remote control device 7 includes vehicle communicator 71, vehicle manager 72, monitoring target recommender 73, operation manager 74, map manager 75, operation receiver 76, monitoring controller 77, video manager 78, and monitoring task accumulator 79.

Vehicle communicator 71 performs wireless or wired communications with each self-driving vehicle 8. Vehicle communicator 71 receives rider status information, vehicle state information, sensing information, and travelled route information. The rider status information indicates a riding status of a rider of self-driving vehicle 8 indicating whether such rider has not got on the vehicle, whether the rider is on the vehicle, whether the rider has got off the vehicle, etc. The vehicle state information indicates: the position of self-driving vehicle 8; vehicle control states such as acceleration, deceleration, velocity, steering, open/close of a door or a window, and headlight; whether vehicle control is normal or anomalous; and the details of anomaly. The sensing information is external sensing data obtained from outside of self-driving vehicle 8 and internal sensing data obtained from inside of self-driving vehicle 8. The external sensing data of self-driving vehicle 8 is, for example, video showing the outside of self-driving vehicle 8, the distance between self-driving vehicle 8 and an object, the road condition of the road on which self-driving vehicle 8 is running, etc. The internal sensing data of self-driving vehicle 8 is video showing the inside of self-driving vehicle 8, temperature, humidity, lighting, and the position of an object inside the vehicle, etc. The travelled route information is information indicating the route on which self-driving vehicle 8 has actually travelled.

Vehicle communicator 71 also sends, to self-driving vehicle 8, an operation instruction, a scheduled route, and a remote control instruction and a manual driving instruction. The operation instruction is an instruction for causing self-driving vehicle 8 to operate in accordance with the operation schedule. The scheduled route is a route on which self-driving vehicle 8 is to travel. The remote control instruction is an instruction for remotely controlling self-driving vehicle 8.

Vehicle manager 72 manages the operation of self-driving vehicle 8. Vehicle manager 72 outputs an operation instruction for self-driving vehicle 8 on the basis of the operation schedule indicated in the vehicle dispatch instruction from operation manager 74. More specifically, vehicle manager 72 causes self-driving vehicle 8 to wait or move from the place of departure to the destination along the scheduled route, on the basis of the operation schedule indicated in the vehicle dispatch instruction.

Vehicle manager 72 also manages presentation to be provided in self-driving vehicle 8, on the basis of the rider status information. More specifically, vehicle manager 72 obtains the user information from vehicle booking/allocation device 5, and obtains the rider status information from self-driving vehicle 8 via vehicle communicator 71. Vehicle manager 72 identifies, from the rider status information, a rider who is on self-driving vehicle 8 to determine whether such identified rider is a rider capable of driving indicated in the user information. When determining that the identified rider is a rider capable of driving, vehicle manager 72 guides, via presentation device 8a, such rider capable of driving toward the driver's seat. For example, vehicle manager 72 causes, via vehicle communicator 71, presentation device 8a to output presentation information that guides such rider capable of driving to be seated in the driver's seat.

Meanwhile, when determining that the identified rider is a rider different from a rider capable of driving, vehicle manager 72 guides, via presentation device 8a, such another rider toward a seat other than the driver's seat. For example, vehicle manager 72 causes, via vehicle communicator 71, presentation device 8a to output presentation information that guides such another rider to be seated in a seat other than the driver's seat.

Note that vehicle manager 72 may send the presentation information to terminal device 3 via vehicle booking/allocation device 5, etc., instead of presentation device 8a.

The presentation information is information that guides a rider toward a specified place by voice or characters saying, for example, "please be seated in the driver's seat", when a rider is capable of driving, and "please be seated in a rear seat", when a rider is incapable of driving. Alternatively, such information takes the form of an image, etc. indicating, by an arrow, etc., the seat to which a rider is desired to be seated.

Vehicle manager 72 may also notify, via presentation device 8a, a rider capable of driving of a driving request, when self-driving vehicle 8 on which the rider capable of driving is riding becomes unable to run autonomously. For example, when self-driving vehicle 8 becomes unable to run autonomously while in operation, vehicle manager 72 generates presentation information that guides the rider having the driving skills to perform manual driving, and causes presentation device 8a to present such presentation information. The presentation information may take the form of voice or image as described above. Note that the driving request may be notified upon receipt of a manual driving instruction.

Further, when self-driving vehicle 8 is to be manually operated by a rider capable of driving who is on the vehicle, vehicle manager 72 provides driver assist information appropriate to such rider capable of driving via presentation device 8a. For example, vehicle manager 72 generates driver assist information for assisting the driving of the rider with the driving skills, and provides the generated driver assist information to such rider. The driver assist information includes the presentation of a drive guide, the presentation of danger information, the presentation or automatic adjustment of the amount of driving operation, etc. The drive guide is, for example, a route guide indicating, for example, an alternative route that avoids a construction site on the road or a drive action guide for the vehicle, for example, to be parked at a road shoulder. The danger information is information indicating a possible danger, for example, that a person rushes out from the shadow. The amount of driving operation is the amount of operating the steering wheel, the acceleration pedal, the brake pedal, etc. Note that the driver assist information may be generated on the basis of the past inputs performed by a remote control operator.

Monitoring target recommender 73 determines self-driving vehicle 8 to be recommended to an operator as a monitoring target. More specifically, monitoring target recommender 73 obtains the user information from vehicle booking/allocation device 5 via vehicle manager 72 and the vehicle state information from each self-driving vehicle 8 via vehicle manager 72 and vehicle communicator 71.

Monitoring target recommender 73 determines the monitoring priority of each self-driving vehicle 8 in accordance with the result of allocating riders capable of driving. More specifically, monitoring target recommender 73 gives a lower monitoring priority to self-driving vehicle 8 to which a rider capable of driving is allocated than the monitoring priority of self-driving vehicle 8 to which no rider capable of driving is allocated. For example, monitoring target recommender 73 gives a lower monitoring priority to self-driving vehicle 8 whose rider is indicated in the user information as having the driving skills than that of self-driving vehicle 8 on which a rider having no driving skill is riding.

Monitoring target recommender 73 determines the monitoring priority of each self-driving vehicle 8 also on the basis of the vehicle state information. When the vehicle state information indicates anomaly in the vehicle control, for example, monitoring target recommender 73 gives a high monitoring priority.

Monitoring target recommender 73 determines the monitoring priority of each self-driving vehicle 8 also on the basis of the sensing information. For example, when it is detected, from the external sensing data of the vehicle, that the distance to an obstacle is short, monitoring target recommender 73 gives a high monitoring priority. When it is detected, from the internal sensing data of the vehicle, that anomaly is witnessed in the behavior of a rider, monitoring target recommender 73 gives a high priory.

Monitoring target recommender 73 outputs, to monitoring controller 77, the monitoring priority of each self-driving vehicle 8 and the monitoring target. Here, monitoring target recommender 73 may determine, as a monitoring target, self-driving vehicle 8 whose monitoring priority is greater than or equal to a specified value, and output, to monitoring controller 77, only such monitoring priority and monitoring target.

Upon obtaining the vehicle dispatch request from vehicle booking/allocation device 5, operation manager 74 generates an operation schedule of self-driving vehicle 8 indicated in the vehicle dispatch request. The operation schedule includes the place of departure, the destination, the time of departure, the time of arrival, and the scheduled route. For example, operation manager 74 calculates a scheduled route from the place of departure to the destination indicated in the vehicle dispatch request, on the basis of map information and road traffic information of map manager 75. Operation manager 74 generates the operation schedule by calculating a scheduled route on the map on which the shortest distance from the place of departure to the destination indicated in the vehicle dispatch request is mapped, or a scheduled route on the map on which a detour route, etc. that is calculated in accordance with the road or traffic conditions is mapped. Operation manager 74 sends a vehicle dispatch instruction for dispatching self-driving vehicle 8 according to the generated operation schedule to self-driving vehicle 8 via vehicle manager 72 and vehicle communicator 71.

Operation manager 74 also manages the operating status of self-driving vehicle 8 that is in operation, on the basis of the obtained vehicle state information and travelled route information. More specifically, operation manager 74 obtains the vehicle state information and travelled route information from self-driving vehicle 8 via vehicle manager 72 and vehicle communicator 71. Operation manager 74 determines the operating status of self-driving vehicle 8 from the vehicle state information and travelled route information. Operation manager 74 sends, to vehicle booking/allocation device 5, the generated operation schedule and the vehicle operation information that includes the determined operating status. Operation manager 74 also outputs, to monitoring controller 77, the vehicle operation information of each self-driving vehicle 8 in operation.

Map manager 75 manages the map information, the road traffic information indicating the road and traffic conditions on the map information, and the operation schedule of self-driving vehicle 8 in the map information. Upon request of operation manager 74, map manager 75 outputs the map information, the road traffic information, or the operation schedule.

Operation receiver 76 receives an operation instruction from operation input device 9b. More specifically, operation receiver 76 outputs, to monitoring controller 77, the received remote control instruction and manual driving instruction intended for self-driving vehicle 8. Upon receiving a monitoring target instruction, operation receiver 76 also stores, in monitoring task accumulator 79, a monitoring task for the monitoring target indicated in the monitoring target instruction. Operation receiver 76 also outputs the monitoring target indicated in the monitoring target instruction to monitoring controller 77. Upon receiving other monitoring-related operation instructions, operation receiver 76 outputs the received operation instructions to monitoring controller 77.

Monitoring controller 77 controls a monitoring target. More specifically, monitoring controller 77 obtains the vehicle operation information of each self-driving vehicle 8 from operation manager 74, and obtains a monitoring target from monitoring target recommender 73 or operation receiver 76. Monitoring controller 77 determines self-driving vehicle 8 to be a monitoring target, in accordance with the monitoring priority and outputs, to video manager 78, the vehicle ID of self-driving vehicle 8 determined to be the monitoring target.

Monitoring controller 77 also allocates a monitoring task to operator(s). More specifically, monitoring controller 77 obtains, from monitoring task accumulator 79, the monitoring task for self-driving vehicle 8 determined to be the monitoring target, and allocates the obtained monitoring task to at least one of a plurality of operators. Note that the monitoring task may be outputted to video manager 78 to be converted into video.

Video manager 78 manages video used to monitor self-driving vehicle 8. More specifically, video manager 78 obtains, from monitoring controller 77, the vehicle ID of self-driving vehicle 8 to be the monitoring target. Video manager 78 also obtains the sensing information from vehicle communicator 71. Video manager 78 generates video used for monitoring (also referred to simply as "monitoring video") from the sensing information corresponding to the obtained vehicle ID. Video manager 78 also determines the display style of the monitoring video of self-driving vehicle 8 to be the monitoring target, in accordance with the monitoring priority. For example, video manager 78 determines a display style in which the monitoring video of self-driving vehicle 8 with a higher monitoring priority is emphasized than the monitoring video of self-driving vehicle 8 with a lower monitoring priority. Such emphasis of the display style is performed, for example, by changing the sizes, colors, and brightness of the display, with or without a frame, etc. Video manager 78 also determines a display style for self-driving vehicle 8 with a high monitoring priority in which a greater amount of information is provided from the sensing information and the travelled route information.

Subsequently, video manager 78 causes video display device 9a to display the generated monitoring video.

Upon obtaining the monitoring target from operation receiver 76, monitoring task accumulator 79 accumulates the monitoring task for the monitoring target. Monitoring task accumulator 79 outputs the monitoring task upon request of monitoring controller 77. Note that the result of allocating operator(s) to the monitoring task may be accumulated.

[Video Display Device 9a]

As shown in FIG. 3, video display device 9a displays the monitoring video received from video manager 78 of remote control device 7 in accordance with the display style determined by video manager 78.

[Operation Input Device 9b]

Operation input device 9b receives inputs for monitoring or controlling self-driving vehicle 8. More specifically, in accordance with an input, operation input device 9b generates a remote control instruction for remotely controlling self-driving vehicle 8 and a manual driving instruction for switching the mode of self-driving vehicle 8 to manual driving. Operation input device 9b also generates, in accordance with an input, a monitoring target instruction for selecting a monitoring target and other monitoring-related operation instructions. Operation input device 9b sends these various instructions generated to remote control device 7.

Note that operation input device 9b may control whether to accept an operation for a manual driving instruction, depending on whether self-driving vehicle 8 is in a state of being unable to run autonomously. Operation input device 9b may also control whether to accept an operation for a manual driving instruction, depending on whether a rider capable of driving is on self-driving vehicle 8 that is in a state of being unable to run autonomously. For example, when no rider capable of driving is on self-driving vehicle 8, operation input device 9b does not accept an input for a manual driving instruction, and transitions to a state of accepting a remote control instruction. In this case, an operator remotely controls self-driving vehicle 8 via operation input device 9a and remote control device 7. Note that instead of using operation input device 9a, an operation screen may be used to control whether to accept an operation for a manual driving instruction.

[Self-Driving Vehicle 8]

Self-driving vehicle 8 is a vehicle that is connected to remote control device 7 via a network to be able to perform communications with remote control device 7. Self-driving vehicle 8 has the function of switching from self-driving mode to manual driving mode and from manual driving mode to self-driving mode. Note that to switch to manual driving, self-driving vehicle 8 may prompt a rider to perform manual driving in an environment where self-driving is difficult.

Self-driving vehicle 8 includes sensors for sensing a status of self-driving vehicle 8, and the outside or inside of self-driving vehicle 8. Such sensors generate the sensing information described above. Examples of the sensors include an acceleration sensor, an angular velocity sensor, an imaging sensor, a LIDAR, a millimeter wave sensor, an infrared sensor, a microphone, a global navigation satellite system (GNSS).

Self-driving vehicle 8 detects that a rider has got on or off self-driving vehicle 8 from the external and internal sensing data of the sensors. Self-driving vehicle 8 generates the detection result as rider status information.

Self-driving vehicle 8 also detects a vehicle control status from the sensing data of the sensors about the status. Self-driving vehicle generates the detection result as vehicle state information.

Self-driving vehicle 8 also generates sensing information, which is the external and internal sensing data of the sensors.

Self-driving vehicle 8 also generates travelled route information indicating a route travelled by self-driving vehicle 8 from the sensing data of the sensors about positions.

Subsequently, self-driving vehicle 8 sends, to remote control device 7, the generated rider status information, vehicle state information, sensing information, and travelled route information.

Upon obtaining a manual driving instruction from operation input device 9b via remote control device 7, self-driving vehicle 8 switches from self-driving mode to manual driving mode. Upon obtaining a driving request from remote control device 7, self-driving vehicle 8 also requests a rider capable of driving to perform manual driving via presentation device 8a, etc. included in self-driving vehicle 8.

<Operation>

The following describes an operation performed by information processing system 1 with the above configuration.

First, with reference to FIG. 4, processes performed by vehicle allocation controller 54 of vehicle booking/allocation device 5 will be described. Here, the description is given of the processes performed by vehicle allocation controller 54 of generating bookable vehicle information, when a booking person performs an input for a ride booking via terminal device 3.

Figure 4:
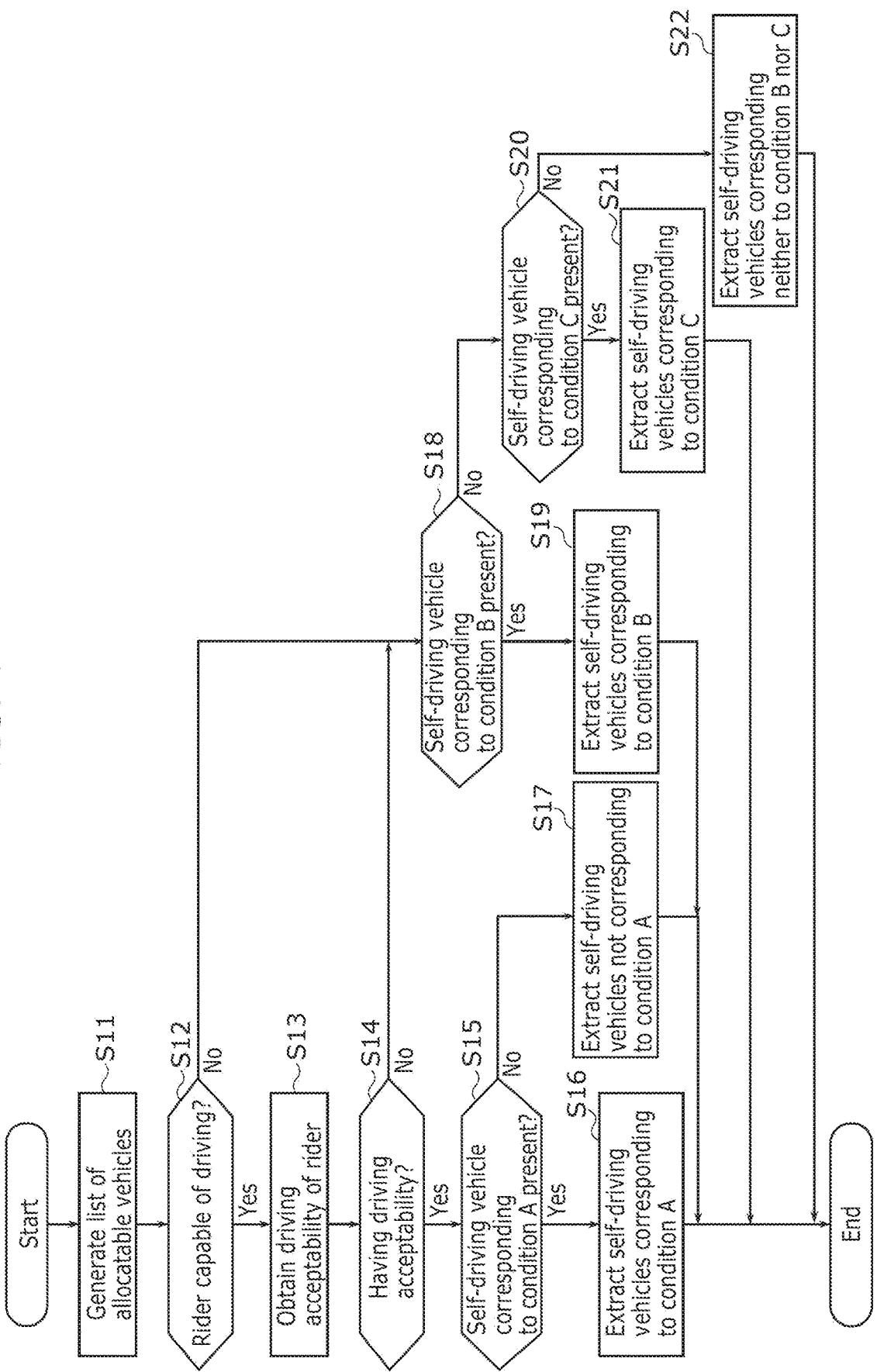
FIG. 4 is a flowchart of an operation performed by the information processing system according to the embodiment.

FIG. 4 is a flowchart of the operation performed by information processing system 1 according to the embodiment.

As shown in FIG. 4, vehicle allocation controller 54 obtains a list of allocable self-driving vehicles 8. More specifically, vehicle allocation controller 54 refers to the operating vehicle database in second memory 55 to extract self-driving vehicles 8 that satisfy the desired conditions of the ride booking made by the booking person obtained via booking processor 53. For example, vehicle allocation controller 54 extracts, from the operating vehicle database, self-driving vehicles 8 having the operation schedules of operating between the place of departure and the destination indicated in the ride booking. Vehicle allocation controller 54 also extracts self-driving vehicles 8 having no operation schedule. Vehicle allocation controller 54 generates a list of the extracted self-driving vehicles 8 as an allocatable vehicle list (S11).

Vehicle allocation controller 54 determines whether the booking person is capable of driving. More specifically, vehicle allocation controller 54 refers to the rider database to obtain the driving qualification information of the rider indicated in the ride booking. Vehicle allocation controller 54 then determines whether the booking person is capable of driving, on the basis of the driving qualification information (S12).

When the booking person is capable of driving (YES in S12), vehicle allocation controller 54 obtains the driving acceptability of the booking person indicated in the ride booking (S13).

Vehicle allocation controller 54 determines whether the booking person has an acceptability for driving, on the basis of the driving acceptability of such person. More specifically, vehicle allocation controller 54 determines whether the booking person is willing to drive self-driving vehicle 8 when the vehicle is in manual driving mode, on the basis of the driving acceptability (S14).

When the booking person capable of driving has the driving acceptability (YES in S14), vehicle allocation controller 54 determines whether self-driving vehicles 8 are present that satisfy a condition that the vehicle is booked by no other rider capable of driving and has empty seat(s) (such condition is hereinafter referred to as "condition A") (S15). Note that self-driving vehicle 8 having empty seat(s) may be self-driving vehicle 8 having an empty driver's seat.

When self-driving vehicles 8 that satisfy condition A are present (YES in S15), vehicle allocation controller 54 extracts self-driving vehicles 8 corresponding to condition A (S16). Vehicle allocation controller 54 generates bookable vehicle information that includes information about the extracted self-driving vehicles 8, and sends the bookable vehicle information to terminal device 3 via booking processor 53. Through the above processes, it is possible to cause the booking person capable of driving to book self-driving vehicle 8 that is booked by no other rider capable of driving.

When no self-driving vehicle 8 that satisfies condition A is present (NO in S15), vehicle allocation controller 54 extracts self-driving vehicles 8 not corresponding to condition A (S17). For example, vehicle allocation controller 54 extracts self-driving vehicles 8 having empty seat(s).

When the booking person is incapable of driving (NO in S12), or when the booking person capable of driving has no driving acceptability (NO in S14), vehicle allocation controller 54 determines whether self-driving vehicles 8 are present that satisfy a condition that the vehicle is booked by another rider capable of driving and has empty seat(s) (such condition is hereinafter referred to as "condition B") (S18).

When self-driving vehicles 8 that satisfy condition B are present (YES in S18), vehicle allocation controller 54 extracts self-driving vehicles 8 corresponding to condition B (S19). Vehicle allocation controller 54 generates bookable vehicle information that includes information about the extracted self-driving vehicles 8, and sends the bookable vehicle information to terminal device 3 via booking processor 53, etc. Through the above processes, it is possible to cause the booking person who is incapable of driving or having no driving acceptability to book self-driving vehicle 8 that is booked by another rider capable of driving.

When no self-driving vehicle 8 corresponding to condition B is present (NO in S18), vehicle allocation controller 54 determines whether self-driving vehicles 8 are present that satisfy a condition that the vehicle is booked by no other rider capable of driving and still has empty seat(s) after the booking person makes a booking (such condition is hereinafter referred to as "condition C") (S20).

When self-driving vehicles 8 that satisfy condition C are present (YES in S20), vehicle allocation controller 54 extracts self-driving vehicles 8 corresponding to condition C (S21). Vehicle allocation controller 54 generates bookable vehicle information that includes information about the extracted self-driving vehicles 8, and sends the bookable vehicle information to terminal device 3 via booking processor 53, etc. Through the above processes, it is possible to cause the booking person who is incapable of driving or having no driving acceptability to book self-driving vehicle 8 even when such vehicle is booked by no other rider capable of driving.

When no self-driving vehicle 8 corresponding to condition C is present (NO in S20), vehicle allocation controller 54 extracts self-driving vehicles 8 corresponding neither to condition B nor condition C and having empty seat(s) (S22). For example, vehicle allocation controller 54 extracts self-driving vehicles 8 that are booked by no other rider capable of driving and become fully occupied after the booking person makes a booking.

Note that only self-driving vehicles 8 extracted may be presented to the booking person as the bookable vehicle information depending on the condition for extraction. In this case, it is possible to more reliably distribute riders capable of driving across a plurality of self-driving vehicles 8.

Also, benefits may be provided for a booking of self-driving vehicle 8 depending on the condition for extraction. More specifically, vehicle allocation controller 54 provides greater benefits for conditions A, B, and C in stated order. Vehicle allocation controller 54 may provide no benefit when the booking person books self-driving vehicle 8 corresponding to none of conditions A through C. In this case, it is easier to distribute riders capable of driving across a plurality of self-driving vehicles 8, while leaving freedom of selection to the booking person.

Finally, vehicle allocation controller 54 ends the processing.

Through the foregoing processes performed by vehicle allocation controller 54, it is possible for an operator to preferentially monitor self-driving vehicle 8 on which no rider capable of driving is riding via remote control device 7. With this, it is possible to enable the operator to promptly take a control of self-driving vehicle 8 on which no rider capable of driving is riding, even when such vehicle becomes unable to run autonomously. Consequently, it is possible for information processing system 1 to prevent the reduction in the operation efficiency.

Figure 5:
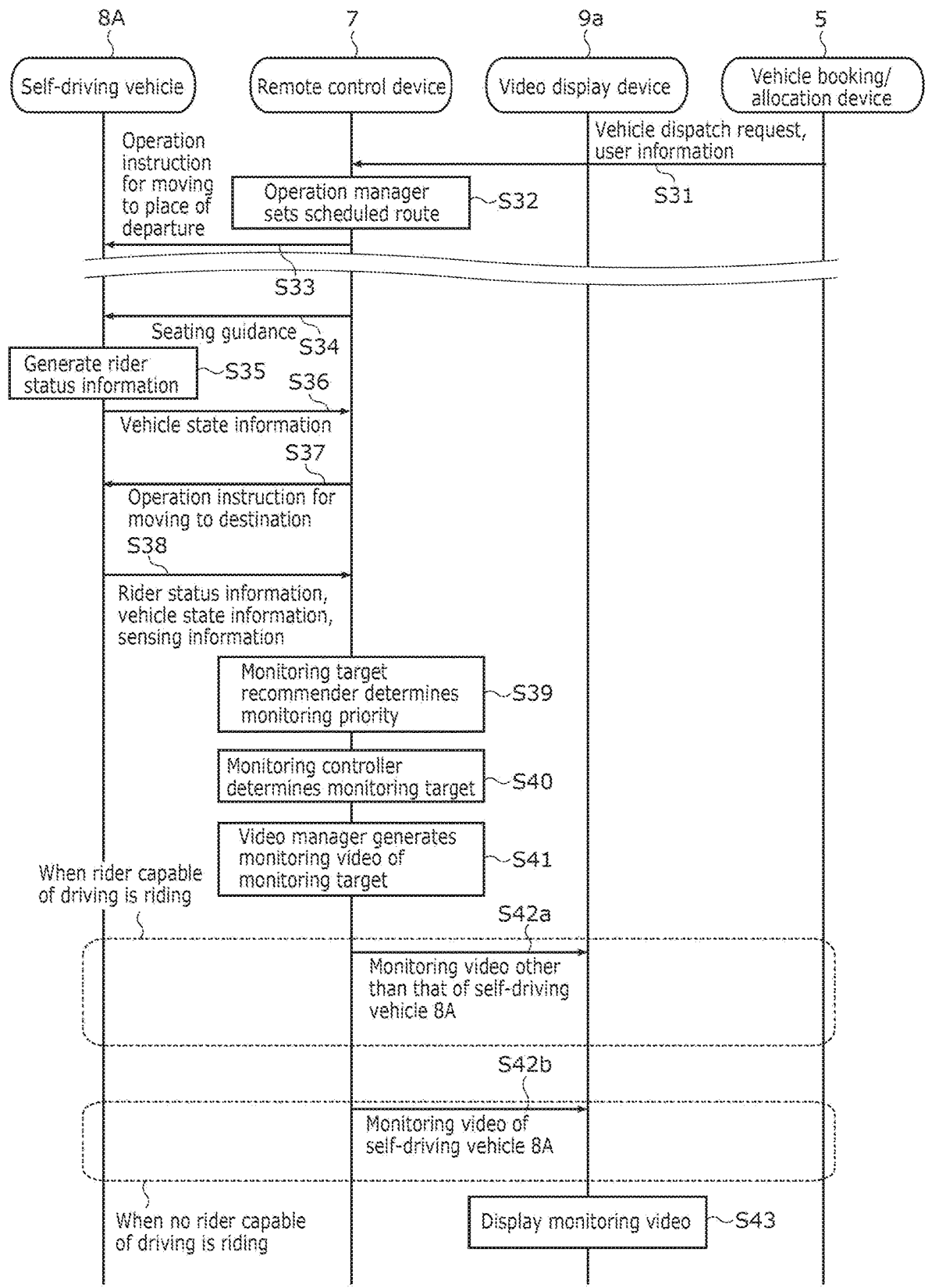
FIG. 5 is a sequence diagram showing an operation performed by the information processing system according to the embodiment.
Figure 6:
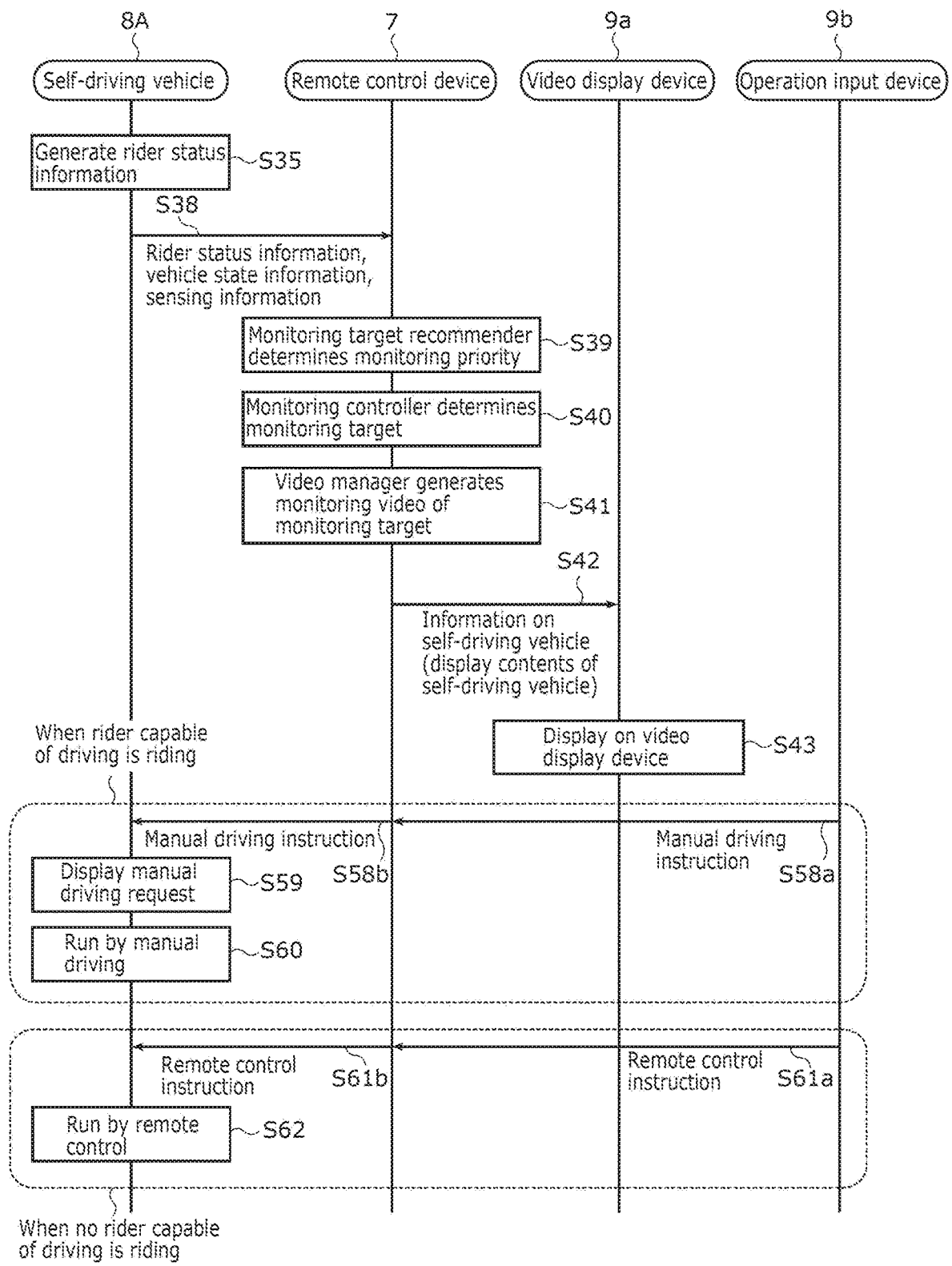
FIG. 6 is a sequence diagram of an operation performed by the information processing system according to the embodiment when a self-driving vehicle becomes unable to run autonomously.

With reference to FIG. 5 and FIG. 6, the following describes the operation performed by information processing system 1.

FIG. 5 is a sequence diagram showing the operation performed by information processing system 1 according to the embodiment.

Here, the description is given of the processes to be performed after the booking person inputs, via terminal device 3, the determination information indicating the desired self-driving vehicle 8A as a response to the bookable vehicle information.

As shown in FIG. 5, upon obtaining, via booking processor 53, the determination information from terminal device 3 of the rider as a response to the bookable vehicle information, vehicle allocation controller 54 of vehicle booking/allocation device 5 sends a vehicle dispatch request and the user information to remote control device 7 via vehicle dispatch request sender 57 to dispatch self-driving vehicle 8A indicated in the obtained determination information (S31).

Upon obtaining the vehicle dispatch request from vehicle booking/allocation device 5, operation manager 74 of remote control device 7 generates an operation schedule of self-driving vehicle 8A indicated in the vehicle dispatch request. More specifically, operation manager 74 sets, as a scheduled route, a route from the place of departure to the destination of the rider, on the basis of the map information and the road traffic information of map manager 75 (S32). Operation manager 74 outputs, to vehicle manager 72, the generated operation schedule and a vehicle dispatch instruction (an operation instruction to move to the place of departure) so that the rider can arrive at the desired place of departure and destination right on time (S33). Vehicle manager 72 causes self-driving vehicle 8A to move via vehicle communicator 71. Through this, self-driving vehicle 8A moves to the place of departure.

When the rider gets on self-driving vehicle 8A at the place of departure, remote control device 7 provides a seating guidance via presentation device 8a (S34). For example, vehicle manager 72 of remote control device 7 guides the rider toward the driver' seat when such rider is capable of driving and guides the rider toward a seat other than the driver's seat when such rider is incapable of driving. Note that the seating guidance may be provided when the opening of a door of self-driving vehicle 8A is detected.

Self-driving vehicle 8A detects the riding status of the rider by a sensor, and generates rider status information indicating the detection result (S35). Note that self-driving vehicle 8A may detect the physical condition of the rider by a sensor included in self-driving vehicle 8A.

Self-driving vehicle 8A also generates vehicle state information, using a sensor, and sends the generated vehicle state information to remote control device 7 (S36).

When remote control device 7 receives the vehicle state information, and it is determined from the vehicle state information that self-driving vehicle 8A is in a travelable state, vehicle manager 72 of remote control device 7 sends an operation instruction for causing self-driving vehicle 8A to move to the destination in accordance with the operation schedule to self-driving vehicle 8A via vehicle communicator 71 (S37). That self-driving vehicle 8A is in a travelable state is, for example, that the rider is seated in a seat of self-driving vehicle 8A and the doors are closed. Upon obtaining the operation instruction, self-driving vehicle 8A starts moving toward the destination of the rider.

Self-driving vehicle 8A sends, to remote control device 7, the generated rider status information, vehicle state information, and sensing information (S38).

Monitoring target recommender 73 determines the monitoring priority of self-driving vehicle 8A, in accordance with the result of allocating a rider capable of driving (S39). For example, monitoring target recommender 73 gives a low monitoring priority when a rider of self-driving vehicle 8A has the driving skills, and gives a high monitoring priority when the rider has no driving skills. Monitoring target recommender 73 outputs the determined monitoring priority to monitoring target controller 77.

Upon obtaining the monitoring priority from monitoring target recommender 73, monitoring controller 77 determines a monitoring target in accordance with the monitoring priority (S40). For example, when the monitoring priority of self-driving vehicle 8A is higher than the monitoring priorities of other self-driving vehicles 8, monitoring controller 77 determines that self-driving vehicle 8A is to be the monitoring target. Monitoring controller 77 outputs, to video manager 78, information on self-driving vehicle 8 determined to be the monitoring target.

Upon obtaining, from monitoring controller 77, the information on self-driving vehicle 8 to be the monitoring target, video manager 78 generates monitoring video of self-driving vehicle 8 to be the monitoring target (S41).

In the case where a rider capable of driving is riding on self-driving vehicle 8A (i.e., when the monitoring priority of self-driving vehicle 8A is low), video manager 78 generates monitoring video of self-driving vehicle 8 other than self-driving vehicle 8A. Video manager 78 sends the generated monitoring video to video display device 9a (S42a).

Meanwhile, in the case where no rider capable of driving is riding on self-driving vehicle 8A (i.e., when the monitoring priority of self-driving vehicle 8A is high), video manager 78 generates monitoring video of self-driving vehicle 8A. Video manager 78 sends the generated monitoring video to video display device 9a (S42b).

Video display device 9a displays the monitoring video of self-driving vehicle 8 received from video manager 78 of remote control device 7 (S43).

In either of the cases of step S42a or step S42b, video display device 9a displays information on self-driving video 8 on which no rider capable of driving is riding.

With reference to FIG. 6, the following describes the operation performed by information processing system 1. The same processes as those shown in FIG. 5 are assigned the same reference marks and will not be described as appropriate.

FIG. 6 is a sequence diagram of the operation performed by information processing system 1 according to the embodiment when self-driving vehicle 8 becomes unable to run autonomously.

Here, the description will be given of the processes to be performed after self-driving vehicle 8A becomes unable to run autonomously while in operation.

As shown in FIG. 6, self-driving vehicle 8A detects, by a sensor, the riding status of the rider who has got on the vehicle, and generates rider status information indicating the detection result (S35).

Self-driving vehicle 8A sends, to remote control device 7, the generated rider status information, vehicle state information, and sensing information at predetermined time intervals (S38).

Monitoring target recommender 73 determines the monitoring priority of self-driving vehicle 8A, in accordance with the result of allocating a rider capable of driving (S39).

Upon obtaining the monitoring priority from monitoring target recommender 73, monitoring controller 77 determines self-driving vehicle 8 to be the monitoring target, in accordance with the monitoring priority (S40).

Upon obtaining, from monitoring controller 77, the information on self-driving vehicle 8 to be the monitoring target, video manager 78 generates monitoring video of self-driving vehicle 8 to be the monitoring target (S41).

Video manager 78 sends the monitoring video of self-driving vehicle 8 to be the monitoring target to video display device 9a (S42).

Video display device 9a displays the monitoring video of self-driving vehicle 8 received from video manager 78 of remote control device 7 (S43).

In the case where a rider capable of driving is riding on self-driving vehicle 8A (i.e., when the monitoring priority of self-driving vehicle 8A is low), operation input device 9b sends a manual driving instruction to remote control device 7, on the basis of an operator's input (S58a). Remote control device 7 sends the received manual driving instruction and a driving request to self-driving vehicle 8 (S58b).

Upon receiving the manual driving instruction, self-driving vehicle 8 switches from self-driving mode to manual driving mode. Also, presentation device 8a of self-driving vehicle 8 displays a manual driving request to a rider on the basis of the driving request (S59).

A rider on self-driving vehicle 8A capable of driving drives self-driving vehicle 8A in manual driving mode, thereby enabling self-driving vehicle 8A to run by being manually operated (S60).

In the case where no rider capable of driving is riding on self-driving vehicle 8A (i.e., when the monitoring priority of self-driving vehicle 8A is high), operation input device 9b sends a remote control instruction to remote control device 7, on the basis of an operator's input (S61a). Remote control device 7 sends the received remote control instruction to self-driving vehicle 8A (S61b).

Upon receiving the remote control instruction, self-driving vehicle 8A switches from self-driving mode to remote control mode. Through this, the operator takes a remote control of self-driving vehicle 8A, thereby enabling self-driving vehicle 8A to run by being remotely controlled (S62).

<Operational Advantages>

The following describes the operational advantages achieved by the information processing method and information processing system 1 according to the embodiment.

As described above, according to the information processing method and information processing system 1 according to the present embodiment, a plurality of riders capable of driving are allocated to be distributed across plurality of self-driving vehicles 8 as much as possible. This reduces the possibility that no rider capable of driving is riding on self-driving vehicle 8. Stated differently, this facilitates the allocation of at least one rider capable of driving to one self-driving vehicle 8. As such, even when self-driving vehicle 8 switches from self-driving mode to manual driving mode, for example, a rider capable of driving can drive self-driving vehicle 8 that is in manual driving mode. This prevents the operation of self-driving vehicle 8 from stopping. This also reduces the number of self-driving vehicles 8 on which no rider capable of driving is riding, i.e., the number of self-driving vehicles 8 that need to be remotely controlled by operators. Consequently, it is possible to prevent the operations of self-driving vehicles 8 from stopping due to the shortage of operators. Stated differently, it is possible to increase the number of self-driving vehicles 8 with reduced operator intervention. As described above, the present disclosure is capable of reducing operator intervention in self-driving vehicles 8, while preventing the operations of self-driving vehicles 8 from stopping.

[Other Variations, Etc.]

The present disclosure has been described above on the basis of the embodiment, but the present disclosure is not limited to such embodiment, etc.

For example, the foregoing embodiment describes an exemplary case where operation input device 9b generates a manual driving instruction. However, a manual driving instruction may be generated by remote control device 7. For example, when it is detected, from the vehicle state information, that self-driving vehicle 8 becomes unable to run autonomously, it is then determined whether a rider capable of driving is riding on such self-driving vehicle 8, on the basis of the user information. When it is determined that a rider capable of driving is riding, a manual driving instruction is generated to be sent to self-driving vehicle 8. When it is determined that no rider capable of driving is riding, a manual driving instruction is not to be generated. When a manual driving instruction is not to be generated, a remote control instruction may be sent. Such processes may be performed by, for example, vehicle manager 72 or monitoring target recommender 73.

Also, in the information processing method and the information processing system according to the foregoing embodiment, vehicle allocation controller 54 may allocate self-driving vehicles 8 to a plurality of riders, also on the basis of the physical conditions of riders capable of driving. More specifically, terminal device 3 causes a booking person to input his/her physical condition at the time of performing an input for a ride booking, and sends physical condition information indicating the inputted physical condition to booking processor 53. Vehicle allocation controller 54 obtains the physical condition information indicating the physical condition of the booking person indicated in the ride booking received from booking processor 53. The physical condition is, for example, a health condition, drunken or not, or the level of drunkenness, etc. The physical condition may also be estimated from a captured image of the face of the booking person, instead of being inputted at the time of booking. When the booking person has the driving skills and is in a good physical condition, i.e., when such person is in a state of being able of drive, vehicle allocation controller 54 allocates, to such booking person, self-driving vehicle 8 that is booked by no rider who is capable of driving and in a good physical condition. When the booking person has the driving skills but such person is not in a good physical condition, i.e., when the booking person is in a state of being unable to drive, vehicle allocation controller 54 allocates, to such booking person, self-driving vehicle 8 that is booked by a rider who is capable of driving and in a good physical condition. Note that the physical condition information may be updated after the booking is completed.

Also, in the information processing method and the information processing system according to the foregoing embodiment, vehicle allocation controller 54 may allocate self-driving vehicles 8 to a plurality of riders, also on the basis of the driving histories of riders capable of driving. More specifically, terminal device 3 causes each rider to input his/her driving history at the time of rider registration, and sends rider information including the inputted driving history to booking processor 53. Booking processor 53 stores, in the rider database, the rider information including the driving history. Vehicle allocation controller 54 refers to the rider database to obtain the driving history of each rider capable of driving. The driving history is, for example, the number of times, the period, etc. a rider capable of driving has actually performed manual driving of self-driving vehicle 8 in manual driving mode. When a booking person has the driving skills and much driving experience, vehicle allocation controller 54, allocates, to such booking person, self-driving vehicle 8 that is booked by no rider capable of driving and having much driving experience. When the booking person has the driving skills but such person has little experience of driving, vehicle allocation controller 54 allocates, to such booking person, self-driving vehicle 8 that is booked by a rider capable of driving and having much driving experience. Note that the driving history may be updated regularly or every time a rider performs driving.

Note that the information processing method and the information processing system according to the foregoing embodiment may be implemented by a program using a computer, and such program may be recorded in a recording device.

Also, each of the processing units included in the information processing system and the information processing method according to the foregoing embodiment may be implemented as a large-scale integration (LSI), which is typically an integrated circuit. The processing units may take the form of individual chips, or one or more or all of them may be encapsulated into a single chip.

The circuit integration is not limited to LSIs. Each of the processing units may thus be implemented as a dedicated circuit or a general-purpose processor. A field programmable gate array (FPGA) that allows for programming after the manufacture of an LSI, or a reconfigurable processor that allows for reconfiguration of the connection and the settings of circuit cells inside an LSI may also be employed.

Each of the elements in the foregoing embodiment may be configured in the form of an exclusive hardware product, or may be realized by executing a software program suitable for the element. Each of the elements may be realized by means of a program executing unit, such as a CPU and a processor, reading and executing the software program recorded on a recording medium such as a hard disk or a semiconductor memory.

The numerics used in the above description are all examples to specifically describe the present disclosure, and thus the embodiment of the present disclosure is not limited to such exemplary numerics.

Also, the division of the functional blocks in the block diagrams is an example, and thus a plurality of functional blocks may be implemented as a single functional block, a single functional block may be divided into a plurality of blocks, or one or more functions may be moved to another functional block. Also, the functions of a plurality of functional blocks having similar functions may be processed by single hardware or software in parallel or in a time-shared manner.

Also, the orders of performing each of the steps in the flowchart are examples to specifically describe the present disclosure, and thus orders other than those described above may be used. Further, one or more of the steps may be performed simultaneously (parallelly) with another step.

The scope of the present disclosure also includes: an embodiment achieved by making various modifications to the embodiment that can be conceived by those skilled in the art; and an embodiment achieved by freely combining elements and functions in the embodiment without departing from the essence of the present disclosure.

INDUSTRIAL APPLICABILITY

The present disclosure is applicable to a self-driving vehicle, a device that remotely controls a self-driving vehicle, a terminal device that presents a status of a self-driving vehicle, or a system including these.

The invention claimed is:

1. An information processing method to be executed by a computer, the information processing method comprising:
   receiving first rider information of a first rider who books allocation of a self-driving vehicle from a terminal device connected to the computer, wherein the first rider information includes: a first driving skill indicating whether the first rider is capable of driving; place-of-departure information indicating a place of departure desired by the first rider; and destination information indicating a destination desired by the first rider; and
   obtaining, from a database, an allocatable self-driving vehicle list indicating a plurality of self-driving vehicles allocatable to the first rider, and a rider list indicating a plurality of second riders who has booked the plurality of self-driving vehicles indicated in the allocatable self-driving vehicle list,
   wherein, in the database, a plurality of scheduled routes corresponding to the plurality of self-driving vehicles are further stored, the plurality of scheduled routes each being a scheduled route set for a second rider who has booked a corresponding one of the plurality of self-driving vehicles, the second rider being included in the plurality of second riders,
   the information processing method further comprises:
   obtaining a second driving skill of each corresponding to the plurality of second riders included in the rider list, the second driving skill indicating whether each of the plurality of second riders is capable of driving;

extracting a self-driving vehicle allocatable to the first rider from among the plurality of self-driving vehicles booked by the plurality of second riders, using a plurality of first driving skills and a plurality of second driving skills corresponding to the plurality of second riders, the plurality of second driving skills each being the second driving skill;

determining the self-driving vehicle extracted as a booked self-driving vehicle to be allocated in response to the booking made by the first rider;

changing the scheduled route set for a second rider who has booked the booked self-driving vehicle, from among the plurality of second riders, to allow the booked self-driving vehicle to arrive at the place of departure indicated in the place-of-departure information and the destination indicated in the destination information; and transmitting, by the computer, to the booked self-driving vehicle, a dispatch instruction and an operation schedule including the scheduled route changed, to cause the booked self-driving vehicle to move along the scheduled route changed, wherein, in the extracting:

when the first driving skill indicates that the first rider is incapable of driving, executing a first determination for determining: whether a first self-driving vehicle is present, the first self-driving vehicle: having been booked by a third rider who is capable of driving among the plurality of self-driving vehicles booked by the plurality of second riders; and having a seat allocatable to the first rider;

when it is determined in the first determination that the first self-driving vehicle is present in the plurality of self-driving vehicles, extracting the first self-driving vehicle as the self-driving vehicle allocatable to the first rider;

when it is determined in the first determination that the first self-driving vehicle is not present in the plurality of self-driving vehicles, executing a second determination for determining whether a second self-driving vehicle is present, the second self-driving vehicle: not having been booked by the third rider among the plurality of self-driving vehicles booked by the plurality of second riders; and having a seat allocatable to the first rider; and when it is determined in the second determination that the second self-driving vehicle is present in the plurality of self-driving vehicles, extracting the second self-driving vehicle as the self-driving vehicle allocatable to the first rider.

2. The information processing method according to claim 1,
wherein, each of the plurality of self-driving vehicles includes a presentation device, and
the information processing method further comprises:
when the first rider is capable of driving, at a time when the first rider is riding on the booked self-driving vehicle, causing the presentation device of the booked self-driving vehicle to present presentation information that guides the first rider toward a driver's seat of the booked self-driving vehicle.

3. The information processing method according to claim 1,
wherein each of the plurality of self-driving vehicles includes a presentation device, and
the information processing method further comprises:

when the first rider is incapable of driving, at a time when the first rider is riding on the booked self-driving vehicle, causing the presentation device of the booked self-driving vehicle to present presentation information that guides the first rider toward a seat other than a driver's seat of the booked self-driving vehicle.

4. The information processing method according to claim 1,
wherein each of the plurality of self-driving vehicles is capable of switching from automatic driving to manual driving, and
the information processing method further causes the computer to executing processing of:
when one of the first rider and the second rider who have booked the booked self-driving vehicle is a fourth rider who is capable of driving, and when the booked self-driving vehicle on which the third rider is riding becomes unable to perform the automatic driving, generating presentation information requesting the fourth rider to perform manual driving of the booked self-driving vehicle; and causing the presentation device of the booked self-driving vehicle to present the presentation information generated.

5. The information processing method according to claim 4,
wherein the information processing method further causes the computer to execute processing of:
when the booked self-driving vehicle on which the fourth rider is riding becomes unable to perform the automatic driving, generating driver assist information for assisting driving of the fourth driver, and
causing the presentation device to present the driver assist information generated.

6. The information processing method according to claim 4, further comprising:
providing a benefit to the fourth rider, based on a result of manual driving performed by the third rider.

7. The information processing method according to claim 1,
wherein vehicle information generated as bookable vehicle information further includes presentation information indicating that a benefit is available for each of one or more self-driving vehicles included in the vehicle information.

8. The information processing method according to claim 1, further comprising:
determining a monitoring priority of the booked self-driving vehicle; and
notifying a monitoring person of information on the self-driving vehicle in accordance with the monitoring priority determined.

9. The information processing method according to claim 8,
wherein, when one of the first rider and the second rider who have booked the booked self-driving vehicle is a rider who is capable of driving, in the determining, a first monitoring priority is determined as the monitoring priority,
when the one of the first rider and the second rider who have booked the booked self-driving vehicle is a rider who is incapable of driving, in the determining, a second monitoring priority is determined as the monitoring priority, and
the first monitoring priority is lower than the second monitoring priority.

10. An information processing system comprising:
a processor; and a memory in which a program is recorded,
wherein, when the program is executed by the processor, the program causes the processor to execute:
receiving first rider information of a first rider who books allocation of a self-driving vehicle from a terminal device connected to the processor, wherein the first rider information includes: a first driving skill indicating whether the first rider is capable of driving; place-of-departure information indicating a place of departure desired by the first rider; and destination information indicating a destination desired by the first rider; and
obtaining, from a database, an allocatable self-driving vehicle list indicating a plurality of self-driving vehicles allocatable to the first rider, and a rider list indicating a plurality of second riders who has booked the plurality of self-driving vehicles indicated in the allocatable self-driving vehicle list,
wherein, in the database, a plurality of scheduled routes corresponding to the plurality of self-driving vehicles are further stored, the plurality of scheduled routes each being a scheduled route set for a second rider who has booked a corresponding one of the plurality of self-driving vehicles, the second rider being included in the plurality of second riders,
the program further causes the processor to execute:
obtaining a second driving skill of each corresponding to the plurality of second riders included in the rider list, the second driving skill indicating whether each of the plurality of second riders is capable of driving;
extracting a self-driving vehicle allocatable to the first rider from among the plurality of self-driving vehicles booked by the plurality of second riders, using a plurality of first driving skills and a plurality of second driving skills corresponding to the plurality of second riders, the plurality of second driving skills each being the second driving skill;
determining the self-driving vehicle extracted as a booked self-driving vehicle to be allocated in response to the booking made by the first rider;
changing the scheduled route set for a second rider who has booked the booked self-driving vehicle, from among the plurality of second riders, to allow the booked self-driving vehicle to arrive at the place of departure indicated in the place-of-departure information and the destination indicated in the destination information; and
transmitting, by the processor, to the booked self-driving vehicle, a dispatch instruction and an operation schedule including the scheduled route changed, to cause the booked self-driving vehicle to move along the scheduled route changed,
wherein, in the extracting:
when the first driving skill indicates that the first rider is incapable of driving, executing a first determination for determining: whether a first self-driving vehicle is present, the first self-driving vehicle: having been booked by a third rider who is capable of driving among the plurality of self-driving vehicles booked by the plurality of second riders; and having a seat allocatable to the first rider;
when it is determined in the first determination that the first self-driving vehicle is present in the plurality of self-driving vehicles, extracting the first self-driving vehicle as the self-driving vehicle allocatable to the first rider;

when it is determined in the first determination that the first self-driving vehicle is not present in the plurality of self-driving vehicles, executing a second determination for determining whether a second self-driving vehicle is present, the second self-driving vehicle: not having been booked by the third rider among the plurality of self-driving vehicles booked by the plurality of second riders; and having a seat allocatable to the first rider; and
when it is determined in the second determination that the second self-driving vehicle is present in the plurality of self-driving vehicles, extracting the second self-driving vehicle as the self-driving vehicle allocatable to the first rider.

11. The information processing method according to claim 1,
wherein, in the extracting:
when the first driving skill indicates that the first rider is capable of driving, executing a third determination for determining whether a third self-driving vehicle is present, the third self-driving vehicle: not having been booked by the third rider among the plurality of self-driving vehicles booked by the plurality of second riders; and having a seat allocatable to the first rider; and
when it is determined in the third determination that the third self-driving vehicle is present in the plurality of self-driving vehicles, extracting the third self-driving vehicle as the self-driving vehicle allocatable to the first rider.

12. The information processing method according to claim 11,
wherein, when the first rider is capable of driving, in the receiving, a first driving acceptability is further received, the first driving acceptability indicating whether the first rider is willing to drive the self-driving vehicle switched to a state for the manual driving,
the third determination is executed when the first driving skill indicates that the first rider is capable of driving, and when the first driving acceptability indicates that the first driver is willing to perform the manual driving on the self-driving vehicle, and
the first determination is executed when (i) the first driving skill indicates that the first rider is incapable of driving or (ii) the first driving skill indicates that the first rider is capable of driving, and when the first driving acceptability indicates that the first driver is not willing to perform the manual driving on the self-driving vehicle.

13. The information processing method according to claim 11,
wherein, when the first rider is capable of driving, in the receiving, first physical condition information is further received, the first physical condition information indicating whether the first rider is in a good physical condition,
the third determination is executed when the first driving skill indicates that the first rider is capable of driving, and when the first physical condition information indicates that the first driver is in a good physical condition, and
the first determination is executed when (i) the first driving skill indicates that the first rider is incapable of driving or (ii) the first driving skill indicates that the first rider is capable of driving, and when the first physical condition information indicates that the first driver is not in a good physical condition.

14. The information processing method according to claim 1,
- wherein, the information processing method further comprises:
- generating vehicle information including the self-driving vehicle extracted as bookable vehicle information,
- transmitting the bookable vehicle information to the terminal device to cause the terminal device to present the bookable vehicle information, and
- receiving, from the terminal device and in response to the transmitting, determination information including information indicating that it is desired to allocate the self-driving vehicle extracted,
- wherein in the determining, the computer is caused to execute processing of determining, as the booked self-driving vehicle, the self-driving vehicle extracted based on the determining information.

\* \* \* \* \*